(12) United States Patent
Bauer

(10) Patent No.: US 10,664,073 B2
(45) Date of Patent: May 26, 2020

(54) TOUCHPAD AND SYSTEM FOR DETECTING AN OBJECT ON A DETECTION SURFACE, AND GENERATING AND OUTPUTTING OBJECT-SPECIFIC INFORMATION

(71) Applicant: Jörg R. Bauer, Baienfurt (DE)

(72) Inventor: Jörg R. Bauer, Baienfurt (DE)

( * ) Notice: Subject to any disclaimer, the term of this patent is extended or adjusted under 35 U.S.C. 154(b) by 138 days.

(21) Appl. No.: 15/562,503

(22) PCT Filed: Apr. 1, 2016

(86) PCT No.: PCT/EP2016/000547
§ 371 (c)(1),
(2) Date: Jan. 29, 2018

(87) PCT Pub. No.: WO2016/155887
PCT Pub. Date: Oct. 6, 2016

(65) Prior Publication Data
US 2018/0217690 A1    Aug. 2, 2018

(30) Foreign Application Priority Data

Apr. 2, 2015   (DE) .................... 10 2015 004 354

(51) Int. Cl.
*G06F 3/041*    (2006.01)
*G06F 3/0354*   (2013.01)
(Continued)

(52) U.S. Cl.
CPC .......... *G06F 3/03547* (2013.01); *G06F 3/039* (2013.01); *G06F 3/0383* (2013.01);
(Continued)

(58) Field of Classification Search
CPC ..................................... G06F 3/041
See application file for complete search history.

(56) References Cited

U.S. PATENT DOCUMENTS 4,520,368 A * 5/1985 Ims ............................ B41J 2/08
347/39
5,492,370 A * 2/1996 Chatwin .................. B41M 3/14
283/107
(Continued)

FOREIGN PATENT DOCUMENTS

CN    203596000 U    5/2014
DE    102011007112 A1    10/2012
(Continued)

OTHER PUBLICATIONS

English translation of the International Search Report dated Jul. 11, 2016 for parent application No. PCT/EP2016/000547.
(Continued)

*Primary Examiner* — Olga V Merkoulova
(74) *Attorney, Agent, or Firm* — J-Tek Law PLLC; Jeffrey D. Tekanic; Scott T. Wakeman

(57) ABSTRACT

A touchpad (34) includes a plurality of first electrical conductors (24) and a plurality of second electrical conductors (28) that are disposed, in a plan view of the conductors (24, 28), in a crossing manner with the first conductors (24). A contact layer is disposed over the conductors (24, 28). When an object contacts the contact layer, a signal can be picked up from the conductors (24, 28), and the location of the contact on the contact layer can be determined from the signal. The contact layer includes a decorative layer (30) that forms a visually and/or haptically detectable decoration or on which a visually and/or haptically detectable decoration is applied. The decoration or the decorative layer and/or the electrical conductors (24, 28) is/are formed using an electronically-controllable droplet printing method.

2 Claims, 11 Drawing Sheets

(51) Int. Cl.
  *G06F 3/038* (2013.01)
  *G06F 3/039* (2013.01)
  *G06F 3/044* (2006.01)
  *A63F 3/00* (2006.01)
  *A63F 9/24* (2006.01)

(52) U.S. Cl.
  CPC .............. *G06F 3/041* (2013.01); *G06F 3/044* (2013.01); *A63F 3/00643* (2013.01); *A63F 2009/241* (2013.01); *G06F 2203/04103* (2013.01); *G06F 2203/04111* (2013.01)

(56) References Cited

U.S. PATENT DOCUMENTS

| | | | | |
|---|---|---|---|---|
| 2003/0117476 | A1* | 6/2003 | Cross | G06F 3/045 347/107 |
| 2005/0243069 | A1* | 11/2005 | Yorio | G06F 1/1616 345/173 |
| 2006/0062898 | A1* | 3/2006 | Rankin, Jr. | G02F 1/133305 427/58 |
| 2007/0013291 | A1* | 1/2007 | Cok | B82Y 20/00 313/501 |
| 2009/0096757 | A1* | 4/2009 | Hotelling | G06F 3/0416 345/173 |
| 2012/0194457 | A1 | 8/2012 | Cannon et al. | |
| 2013/0002574 | A1 | 1/2013 | Kim et al. | |
| 2013/0235001 | A1* | 9/2013 | Yun | H03H 3/02 345/204 |
| 2013/0265275 | A1 | 10/2013 | Liao et al. | |
| 2016/0223536 | A1* | 8/2016 | Johnson | G01N 33/558 |

FOREIGN PATENT DOCUMENTS

| | | |
|---|---|---|
| EP | 2154503 A2 | 2/2010 |
| EP | 2853386 A1 | 4/2015 |
| WO | 03019519 A1 | 3/2003 |

OTHER PUBLICATIONS

English translation of the Written Opinion dated Jul. 11, 2016 for parent application No. PCT/EP2016/000547.
Examination Report from the European Patent Office dated Dec. 2, 2019 in related EP application No. 16 714 761.0, including a brief explanation in English of the grounds for rejection.

* cited by examiner

FIG. 4A
FIG. 4B
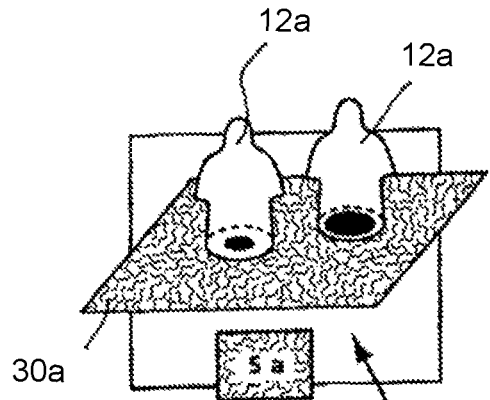
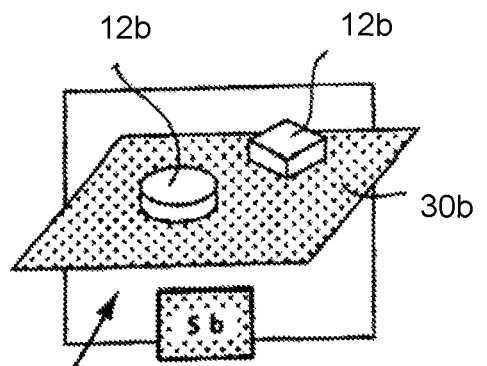
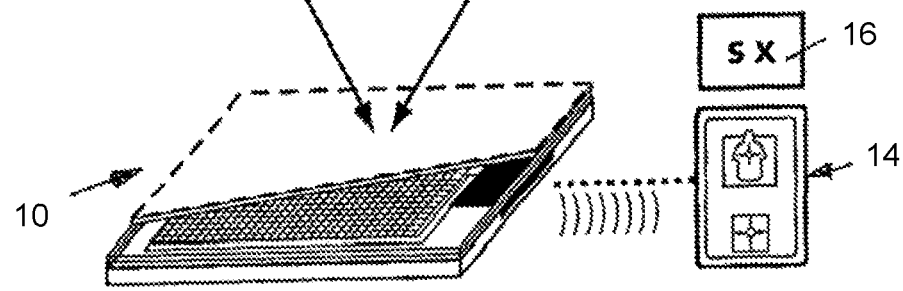
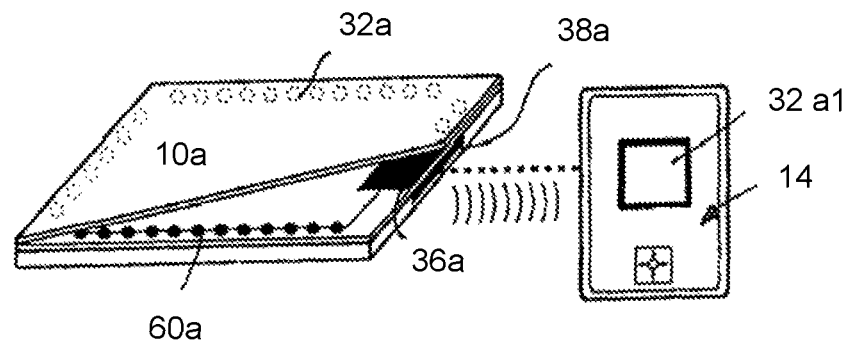
FIG. 5A
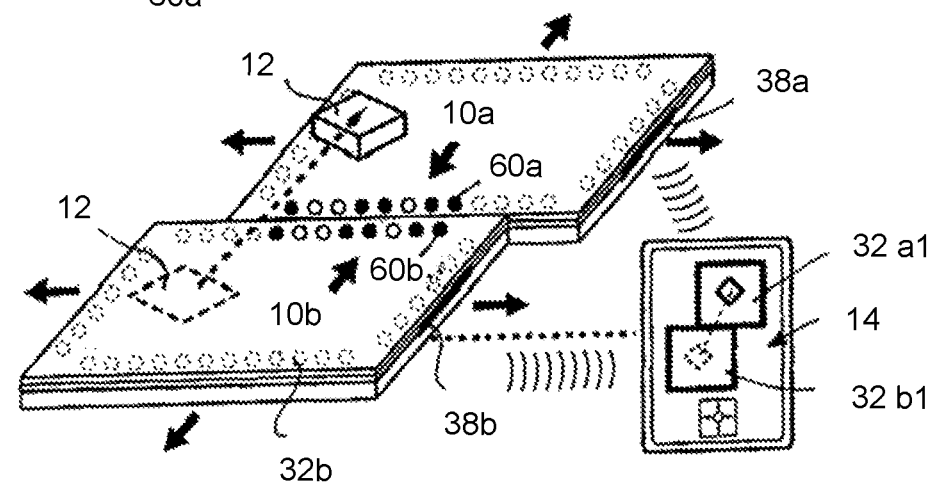
FIG. 5B

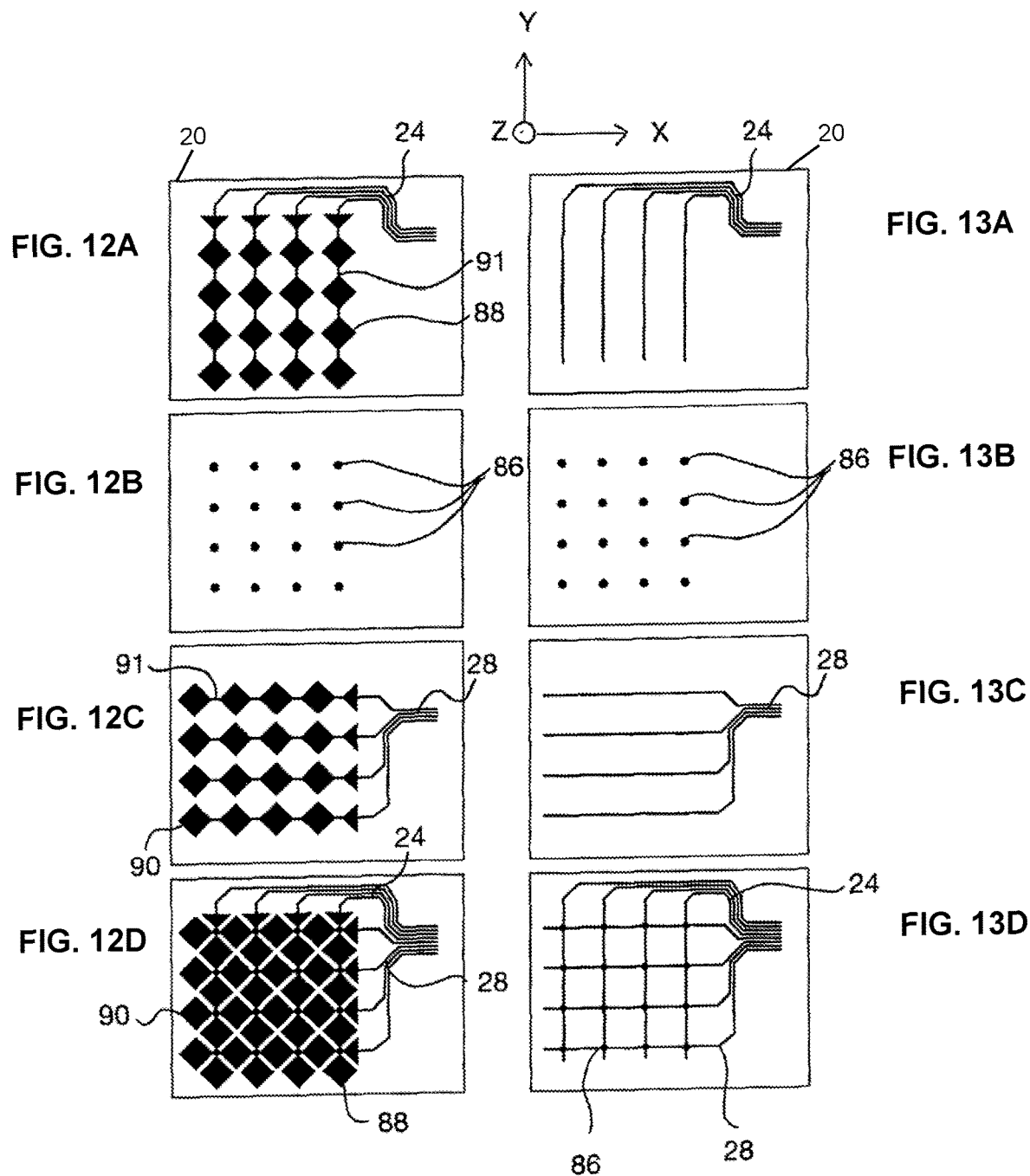

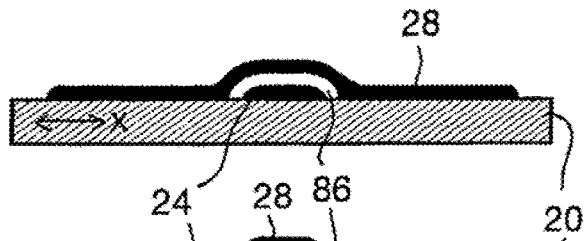
FIG. 14A
FIG. 14B
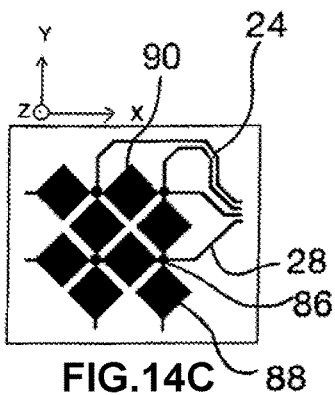
FIG. 14C
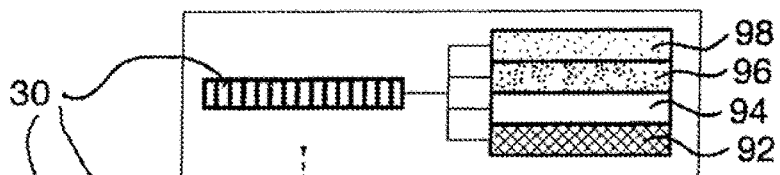
FIG. 15
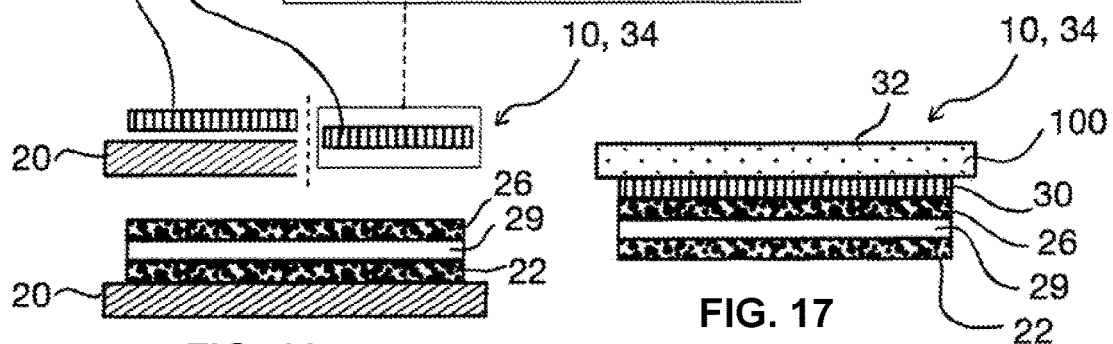
FIG. 16
FIG. 17
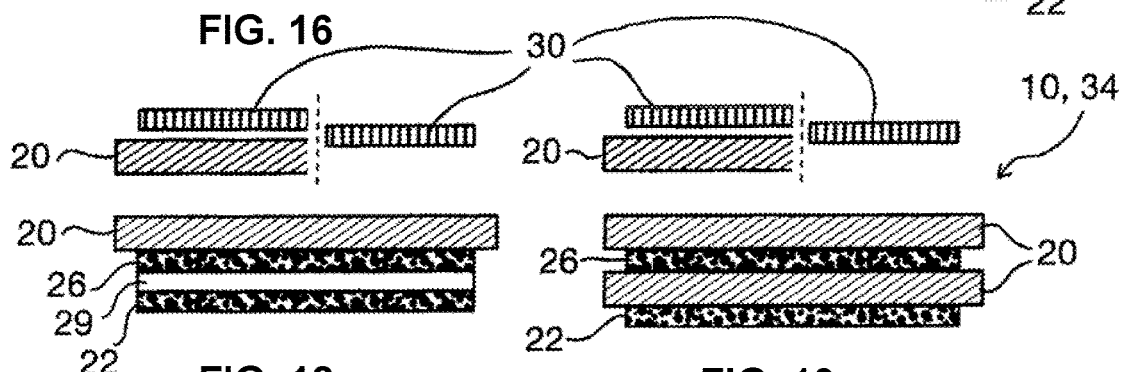
FIG. 18
FIG. 19
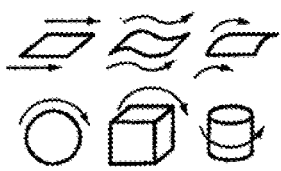
FIG. 20

FIG. 21
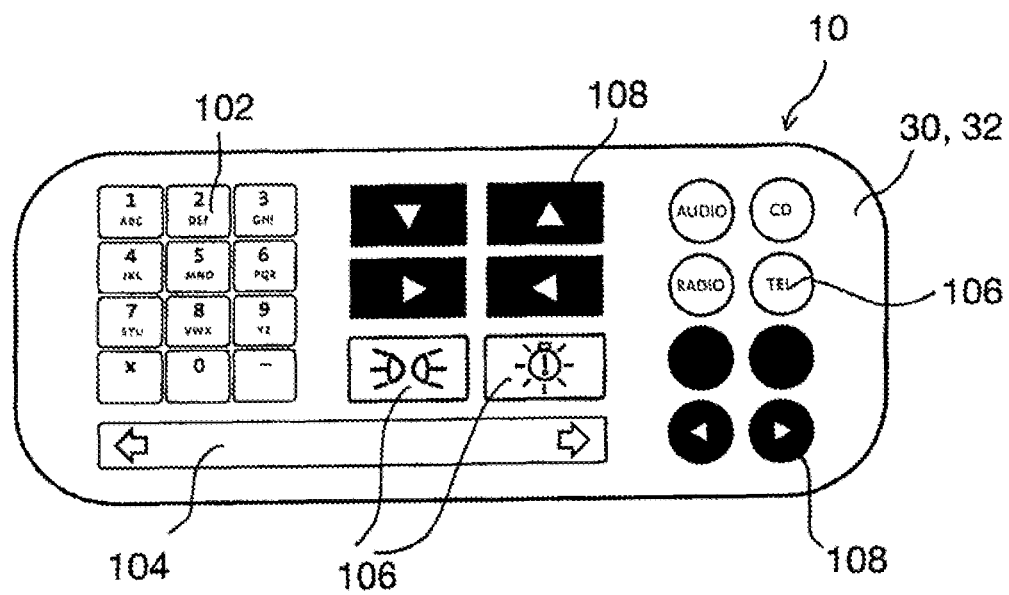
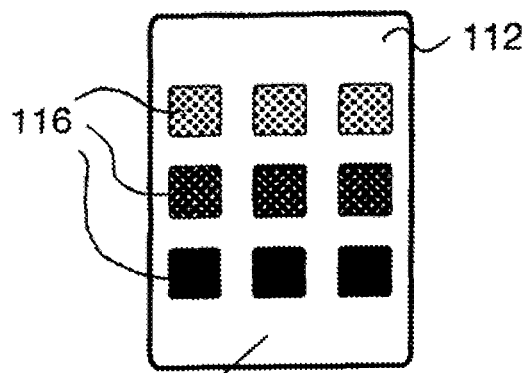
FIG. 22A
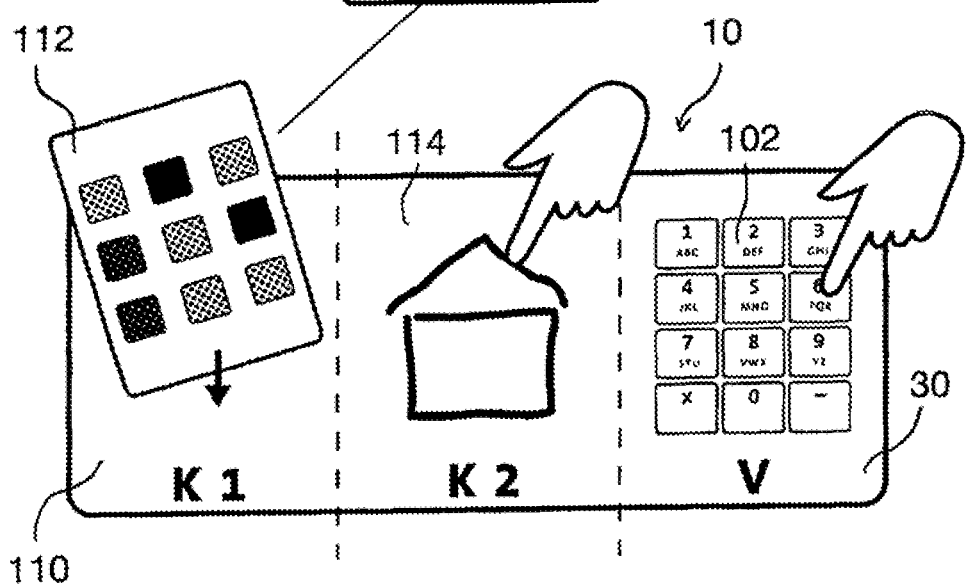
FIG. 22B

TOUCHPAD AND SYSTEM FOR DETECTING AN OBJECT ON A DETECTION SURFACE, AND GENERATING AND OUTPUTTING OBJECT-SPECIFIC INFORMATION

CROSS-REFERENCE

This application is the U.S. national stage of International Application No. PCT/EP2016/000547 filed on Apr. 1, 2016, which claims priority to German patent application no. 10 2015 004 354.4 filed on Apr. 2, 2015.

TECHNICAL FIELD

The invention generally relates to a touchpad and to a system for detecting the position and/or the type of at least one object on a detecting surface, as well as for generating and outputting object-specific information.

RELATED ART

For modern IP communication devices, such as laptops, tablet computers, smartphones, etc., touchpads are now indispensable. Using such touchpads, the position of a finger guided across the touchpad can be detected on the touchpad. A marker (cursor) can be moved across the screen in accordance with the position of the finger; programs stored in the computer are associated with different screen positions and can be activated by the finger.

SUMMARY

An object of the present teachings generally is to provide simple and quickly-manufactured systems equipped with a touchpad that open up new usage possibilities.

In a first aspect of the present disclosure, a decorative layer or a decoration is formed on a contact layer using an inkjet (electronically-controllable droplet) printing method. Owing to the manufacture of the decorative layer or of the decoration, either of which can be completely opaque, using such a printing method, it is possible to adapt the touchpad in a simple manner to widely differing applications, wherein this adaptation is extremely cost-effective and can occur very late in a production process according to customer-specific requirements.

In a second aspect of the present disclosure, the touchpad, in particular its functional part, is manufacturable in a very cost-effective manner, because its conductors are printed using an inkjet (electronically-controllable droplet) printing method. In this way, the touchpad can be adapted to different requirements; for example, the resolution of the touchpad can be easily and cost-effectively modified.

According to another aspect of the present teachings, touchpads may include the features of the above-mentioned first and second aspects.

In systems according to the present teachings, object features (object characteristics) detected by the touchpad in the detecting unit, such as the position of the object and/or data that are characteristic of the object, such as the contour of the underside of the object (which underside is located on the detecting surface), or special features of the object, are sent as object data to a control unit that is separate from the detecting unit. In the control unit, evaluation data are generated from the object data according to a predetermined program, and such evaluation data serve as the basis for information output from an output unit of the control unit.

Any object that is detectable by the touchpad can serve as the object, for example, stylus tips, fingertips, figures, vehicles, etc. In a simple embodiment, the evaluation data contain only the position of an object on the detecting surface. The data can also contain a surface area circumscribed by movement of the object, for example, a writing tip, which surface area forms an operation field that is assigned a specific meaning (command), for example, by inputting a symbol known to the program using the writing tip; the output unit outputs evaluation data in accordance with the specific meaning (command) when the operation field is subsequently contacted (touched).

In the following, the invention is explained in an exemplary manner and with further details with references to the appended drawings.

BRIEF DESCRIPTION OF THE DRAWINGS

FIGS. 4A and 4B depict schematic illustrations for explaining the programmability of systems according to the present teachings.

FIGS. 5A and 5B depict schematic illustrations for explaining the combinability of detecting units according to the present teachings.

FIGS. 12A-12D depict views of inkjet (electronically-controllable droplet) printing patterns for forming a conducting-path design having planar conducting regions.

FIGS. 13A-13D depict views of inkjet (electronically-controllable droplet) printing patterns for forming a conducting-path design having linear conducting regions.

FIGS. 14A-14C depict cross-sectional views of a conducting-path design having planar conducting regions and a corresponding view.

FIG. 15 depicts a detailed cross-sectional view of the possible structure of a decorative layer.

FIG. 16 depicts a cross-sectional view of the layer structure according to a further embodiment.

FIG. 17 depicts a cross-sectional view of the layer structure according to a further embodiment.

FIG. 18 depicts a cross-sectional view of the layer structure according to a further embodiment.

FIG. 19 depicts a cross-sectional view of the layer structure according to a further embodiment.

FIG. 20 depicts a schematic illustration of possible shapes of a carrier layer or of a base body onto which conductors or functional layers can be applied.

FIG. 21 depicts a schematic view of a further embodiment of a detecting unit.

FIGS. 22A and 22B depict schematic views of a further embodiment of a detecting unit and of a corresponding code card.

DETAILED DESCRIPTION OF THE INVENTION

Figure 1A:
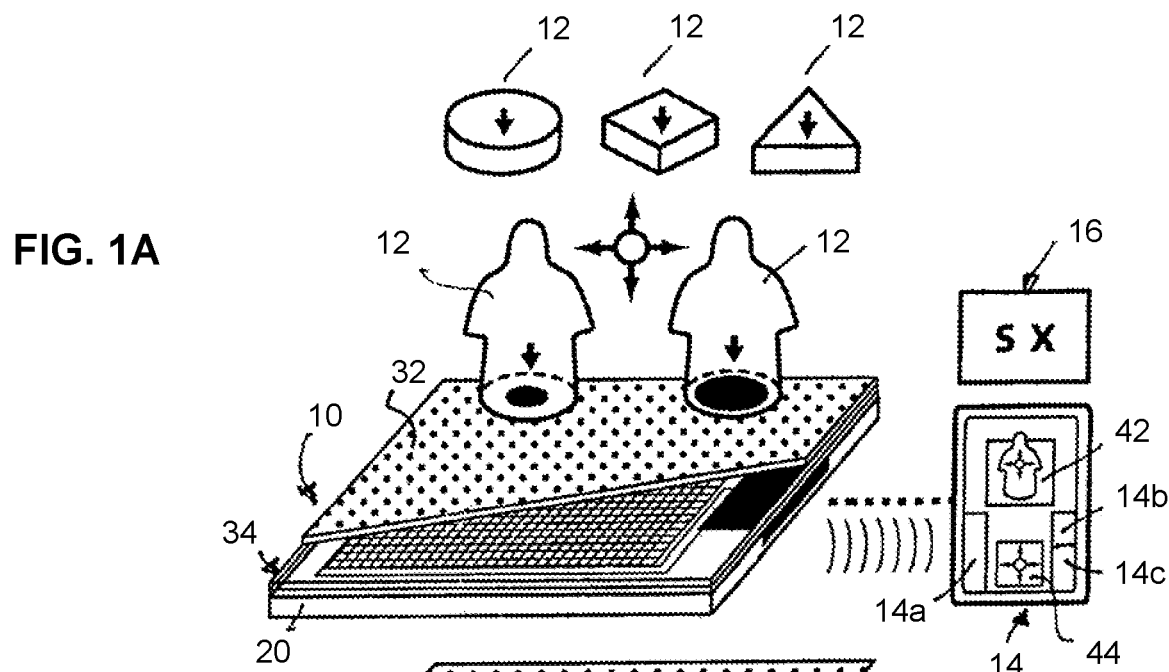
FIG. 1A depicts a schematic perspective view of a system according to the present teachings.

According to FIG. 1A, a system according to the present teachings contains a detecting unit 10, using which objects 12 can be detected, a control unit 14, and a program unit 16.

Figure 1B:
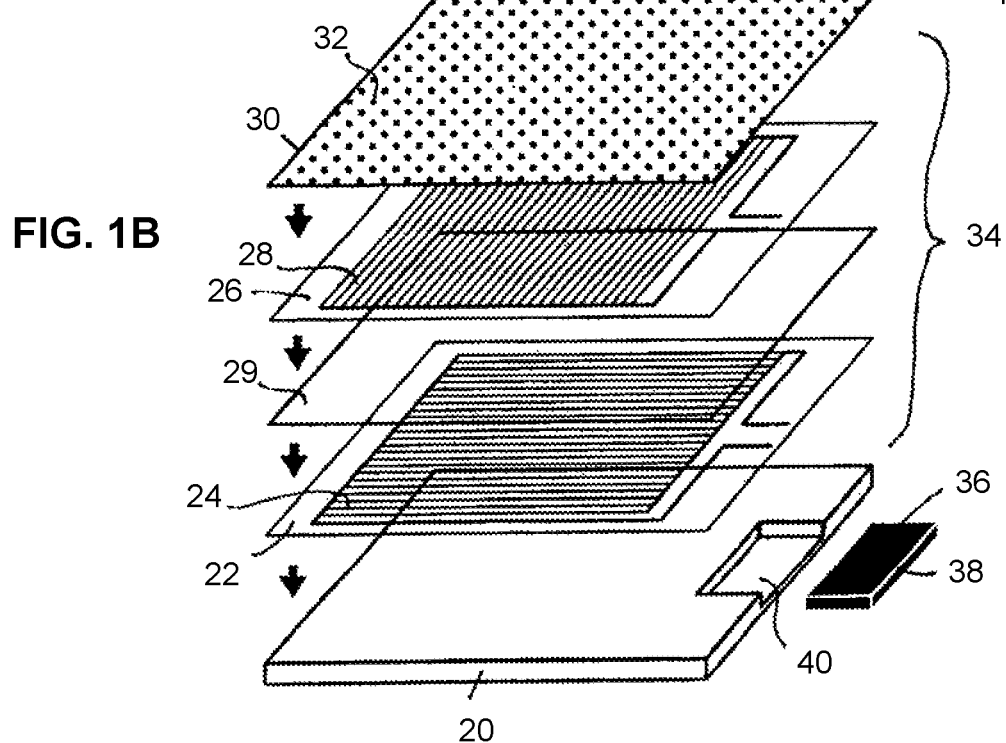
FIG. 1B depicts, in an exploded view, a detecting unit included in the system of FIG. 1.

As can be seen in particular from FIG. 1B, the detecting unit 10 is constructed in a layered manner and includes a carrier layer 20 (for example, a base plate), a first functional layer 22 having electrical conductors 24, a second functional layer 26 having electrical conductors 28, an insulating layer 29, disposed between the layers 22 and 26, for insulating the conductors 24 from the conductors 28, and a contact- and/or decorative layer 30 disposed over the second functional layer 26. The top side of the contact- and/or decorative layer 30 forms a detecting surface 32. The decorative layer 30 includes a decoration on which, for example, positional fields, paths/tracks, visual signs such as ornaments, images, pictograms, graphical surfaces such as color fields or letter-number fields are formed, which form parts of the detecting surface 32. The decorative layer is not configured as a screen, but rather as a (static) layer (optionally completely or partially through-illuminable), preferably formed from color pigments.

Functional layers 22 and 26, which are also referred to as base layers, having the electrical conductors 24 and 28 disposed on them are indicated only in an exemplary manner and, together with the decorative layer 30, form a touchpad or contact field in a known manner, which is denoted overall by reference numeral 34. By using the touchpad 34, the presence of an object 12 on the detecting surface 32 can be detected in a capacitive, resistive, inductive, optical, etc., manner depending on the construction of the touchpad 34. However, in known touchpads, the decorative layer is not configured (provided) with a decoration that is detectable in a visual or haptic manner, but rather is formed only by a contact layer having a homogeneous surface.

Objects 12 that can be detected by the touchpad 34 may be any kind of three-dimensional structure, such as a figure, an animal, a technical object, a card, etc. A customized-detectability of an object 12 can be achieved by detecting the contour of the base surface of the object 12, by detecting conductive materials embedded in or near the base surface of the object 12, or by detecting the weight of the object 12.

The layers forming the touchpad 34 can be manufactured in a variety of ways. For example, the electrically-conductive regions of the functional layers can be applied, using a digital printing system, for example, inkjet (electronically-controllable droplet) printing, to opposite sides of a common (shared) insulating film made of plastic or paper. Preferably the functional layers 22 and 26 are films made of electrically-insulating material (for example plastic or paper), onto which electrically-conductive paths or electrical coatings are applied using an electronically-controllable droplet printing method (inkjet). The films are disposed with their non-electrically-conductively-coated sides on each other. The decorative layer 30 can also be directly applied onto the underlying functional layer using a digital printing system. In the alternative, the decorative layer 30 can contain a prefabricated film, for example, made of plastic or paper, onto which an optical decoration is applied, for example, using inkjet printing. This decoration can be configured in a three-dimensional manner so that, for example, intended positions of objects to be positioned on the detecting surface 32 are also haptically detectable.

The carrier layer 20 can be composed of plastic, such as PE, PET, PS, PP, or paper/cardboard, glass, wood, wood material, metal, or ceramic. The carrier layer 20 can be intrinsically stiff or can be flexible for suitable materials (e.g., film). In the latter case, the entire detecting unit 10 is flexible or even can be folded in its entirety. The carrier layer 20 can be formed directly by a flat or curved outer surface of a three-dimensional component. Using a digital-applicator device controlled by 3-D robotics, all layer portions 24, 29, 28, 30, which are disposed one-atop-the-other, can be directly applied.

The conducting paths or electrically-conductive coatings of the functional layers 22 and 26 are led to an evaluating unit 36 via connecting lines and contacts that are only schematically depicted in the Figures. Using the capacitive function of the touchpad 34, a signal is generated in the evaluating unit 36 in a known manner; the signal contains (is indicative of) the capacitance present at each crossing point between two conducting-path patterns disposed perpendicular to each other, which capacitance depends on whether or not an object is located over (is resting on) one or more crossing points on the detecting surface 32. This signal thus contains object data that depend on the position of an object 12 located on the detecting surface 32. Object data of a plurality of stationary or moving objects 12 located on the decorative layer 30 can be detected in the evaluating unit 36. Movement- and positioning-sequences of the objects can be detected using a software program.

The evaluating unit 36 contains a transmitter unit 38, using which the object data can be sent to one or more further units, for example, the control unit 14, which can be a smartphone, via a wire (for example, a USB plug) or in a contactless manner via WLAN, Bluetooth, NFC, etc. The evaluating unit 36 preferably includes a power supply whose battery can be charged, for example, from the outside via a wire; the battery serves as the energy supply of the electronic components located in the evaluating unit 36 and of the touchpad 34. The energy supply of the evaluating unit 36 can be effected directly from the outside via a cable, so that the evaluating unit 36 need not contain a battery or an accumulator.

The evaluating unit 36 can be an integral component of the detecting unit 10 and is then preferably integrated into the carrier layer 20. The evaluating unit 36 can also be contained in a separate device module, which is advantageously insertable into a recess (receptacle) of the carrier layer 20.

The objects 12, which can be disposed on the detecting surface 32, can be widely different types. The underside of the objects 12 can be, for example, metal-coated, so that the capacitances of the crossing points of the electrically-conductive paths (sensor points) below the underside are changed, and when the distances between the crossing points are correspondingly small, the size of the surface of the underside and its contour can be contained in the object data that are sent from the transmitter unit 38. If only discrete surface areas having metal coatings or electrically-conductive layers are provided on the underside of the objects, or discrete surface area portions having different thickness metal layers are provided on the underside of the objects, the pattern of the conductive regions can be detected by the touchpad and contained in the object data. Thus, not only the position of an object but also specific features of the object, such as shape, size, and patterning or coding of its underside, can be detected by the touchpad 34. It is understood that the electrically-conductive layers on the underside of the objects need not be exposed, but rather can be disposed inside of layers, for example, made of plastic, wood, etc., that form the underside of the objects. The objects 12 depicted in FIG. 1A are exemplary for various shapes, surfaces, patternings or codings of the underside of the objects located on the detecting surface 32.

The control unit 14 can be a smartphone, a tablet computer or other PC, a gaming console, etc. and includes a receiver unit 14a for receiving the object data, a computer 14b for evaluating the object data and generating evaluation data that depend on the object data, a display 42, on which the evaluation data are displayed as the type of the object 12 and/or its position on the detecting surface 32, and an output unit 14c, with which visual and/or acoustic commands determined by the position of the object 12 on the detecting surface 32 and/or by the type of the object 12 can be output.

The program unit 16 contains programs that can be input into the control unit 14. A display 42 and an operation field (control panel) 44 of the control unit 14 are controlled in accordance with the programs.

The above-described system can be used for a very wide variety of applications and purposes.

An example is the following:

Assume that one of the objects 12 is a horse, and another of the objects 12 is a dog. A horse and a dog are then displayed on the display 42 of the control unit 14 at the respective positions on the detecting surface 32. The identification of the objects as a horse or dog is possible by using characteristics of the undersides of the feet of the animals. A program is activated in the control unit 14, which program prompts a user, for example, a child, to move (guide) the horse to its overnight place, e.g., a stall, which is depicted on the detecting surface 32. A doghouse is additionally depicted on the detecting surface 32. At a prompt that can be visualized or is effected acoustically, a user of the system must take the horse and put it on the detecting surface 32 at the stall. It is first recognized by the program activated in the control unit 14 whether the user takes the horse and not the dog. If the user erroneously takes the dog, an error signal is effected (output). Furthermore, the horse must be moved into the stall, which is detected by the touchpad 34. If the horse is not moved into the stall, an error signal is effected (output) again. As can be seen from the preceding example, such a system is suited, for example, for learning by playing.

Numerous further examples of games are possible. The program unit 16 can contain numerous programs that are adapted to the particular detecting surface 32. The detecting surface 32 can have a coding (program) that is read by the program unit 16 such that the program unit 16 in the control unit 14 activates a program corresponding to the particular detecting surface 32 and optionally further parameters, such as a set of objects.

Systems according to the present teachings are suited not only for use with many kinds of games, but also for logistical applications. Assume, for example, that the touchpad 34 is distributed over an entire parking area, wherein each parking space corresponds to a sensor point. The occupancy of the parking spaces is displayed in the display 42 of the control unit 14, so that free parking spaces can be identified. In (at) the entrance to the parking garage, the free (unoccupied) places can be displayed with appropriate instructions for the entrants. In a further development of this aspect of the present teachings, each parking space can be equipped with a plurality of sensor points, so that the size of the parked vehicle and thus the size of a free parking space can be determined. If the size of a newly-entering vehicle is determined when it enters and the determined size of the vehicle is entered into the control unit 14, a vehicle-specific parking suggestion can be given to the driver upon entering the parking garage.

Figure 2:
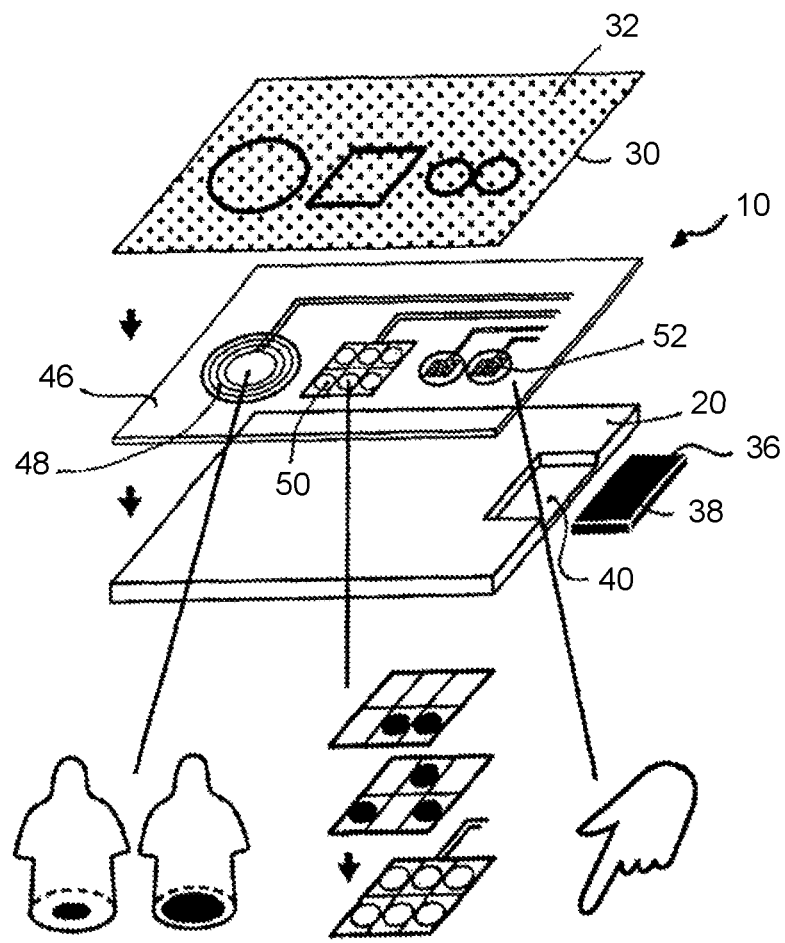
FIG. 2 depicts an embodiment of a detecting unit, which embodiment has been modified as compared to the embodiment shown in FIG. 1.

FIG. 2 shows an embodiment of the detecting unit 10 that, in addition to the touchpad 34 (not depicted in FIG. 2 for the sake of clarity), includes a functional layer 46 having electrical conductors, such as an antenna 48 and/or codable sensor fields 50 and/or switch fields (control buttons) 52, the signals of which are supplied to the evaluating unit 36 and are sent from the transmitter unit 38 to the control unit 14 (FIG. 1A). Thereby, additional signals can be input into the control unit 14 by a user. The functional layer 46 can be disposed directly under the contact layer 30 or directly over the carrier layer 20. The conducting paths of the functional layer 46 can also be applied using a programmable droplet printing method. In order to avoid mutual interference of the touch field with the additionally integrated antennas or sensor fields, the functions can be controlled with an interval switching having an alternating (multiplexing) function.

Figure 3:
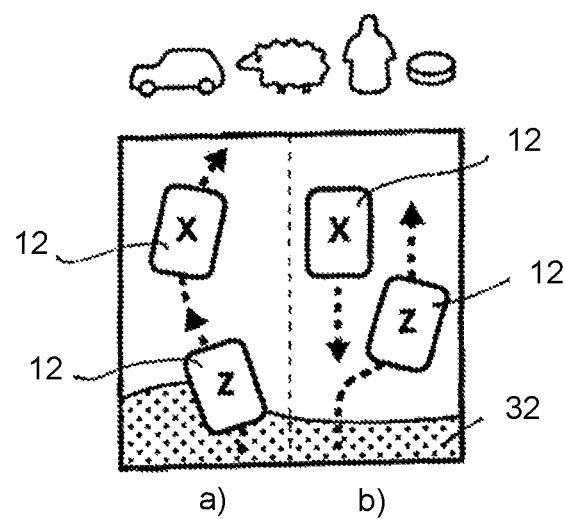
FIG. 3 depicts a schematic illustration for explaining an exemplary use of systems according to the present teachings.

FIG. 3 illustrates an exemplary application of the above-described systems, in which remotely controllable objects 12 are provided with their own drives and can be moved in a controlled manner on the detecting surface 32 by inputting instructions using the operation field (control panel) 44 of the control unit 14. Different tasks can be performed in accordance with the program activated in the control device. Various control units 14 can be associated with the detecting surface 32 and/or the detecting unit 10, wherein the object X is controlled by one control unit and the object Z is controlled by the other (a different) control unit. Here different tasks, such as passing maneuvers, parking, avoiding collisions, etc., must be performed. Here, for example, a task can be that the vehicle Z follows the vehicle X. Another task can be that the vehicles X and Z avoid each other.

FIGS. 4A and 4B illustrate how a detecting unit 10 can be used for different applications or games merely by exchanging the contact layer and optionally the objects. Program Sa is associated with the decorative layer 30a having an optically-designed detecting surface 32a and the objects 12a. Program Sb is associated with the decorative layer 30b having an optically-designed detecting surface 32b and the objects 12b. Thus, different applications having only one detecting unit 10 and only one control unit 14 can be effected merely by exchanging the decorative layer 30 and the objects 12 as well as the program for the control unit 14. The programs Sa and Sb can be stored in separate program units 16 associated with the contact layers 30a and 30b. The programs can also be stored on the contact layers and read by a program unit. Using such a system, it is thus possible to perpetually expand the number of possible games merely by purchasing contact layers 30 having detecting surfaces 32 located thereon and associated programs, and optionally additional objects. The inventive system makes possible games such as "Mensch ärgere dich", Nine Men's Morris, chess, learning games, skill games, etc.

The decorative layers 30 are easily applied to the topside of the detecting unit 10 in an interchangeable manner, for example, as films that are applied to an insulating protective layer disposed over the functional layer 26, or directly on a side of the functional layer 26 that is not provided with electrically-conductive regions. In one production-oriented variant of the inventive system, the detecting unit 10 is customized at the end of the production process in that a decoration that customizes the detecting unit 10 is formed on the decorative layer 30, preferably using digital printing technology. Using associated figure- or object-bundles, different game variants can be produced in combination with software SX. In one customer-oriented variant, the customer can purchase exchangeable decorative layers 30 with associated software bundles and object bundles.

The optically-designed detecting surface 32 (FIGS. 1A and 1B) can be configured in a three-dimensional manner with elevations and/or depressions, curvatures, etc.

In the following, another embodiment of a system according to the present teachings is explained with reference to FIGS. 5A and 5B. According to FIG. 5A, a first detecting unit 10a includes a series of distance sensors 60a along one edge, the output signals of which are transmitted from the transmitter unit 38a of the evaluating unit 36a to the control unit 14. FIG. 5B shows how a second detecting unit 10b having an edge that is also provided with distance sensors 60b is laid alongside the edge of the first detecting unit 10a having the distance sensors 60a. The transmitter unit 38b of the second detecting unit 10b also transmits the output signals of the distance sensors 60b to the control unit 14. Due to the number and position of the distance sensors 60a of the first detecting unit 10a that are activated by laying alongside the detecting unit 10b, and due to the number and position of the activated distance sensors 60b, a combined image of the detecting surfaces 32a1 and 32b1 laid alongside each other can be generated in the control unit 14, so that now both detecting surfaces 32a and 32a, which are connected by a control program into a common playable total area, are available for tracking/visualizing the movement of an object 12. The "play area" is thus expanded. It is understood that all four edges of the detecting units 10 can be provided with distance sensors 60, so that the detecting surfaces 32 can be joined to each other in any manner desired. In a simpler version, only one edge of a detecting unit 10 can be provided with distance sensors 60. If a further detecting unit is laid alongside this edge, the evaluation of the output signals of the distance sensors of the one detecting unit is sufficient to determine the relative positions of the detecting surfaces and to display them using the control unit 14.

The distance sensors 60 can be replaced by touch strips formed along the edge of a detecting surface 32a. A capacitively-acting counterpart component is located on an abutting side of the detecting surface 32b such that the relative positions of the detecting surfaces can be detected. In the alternative, the relative positioning of the mutually-abutting detecting surfaces can be detected by RFID- or NFC-(near-field communication) modules integrated into the edges.

Figure 6A:
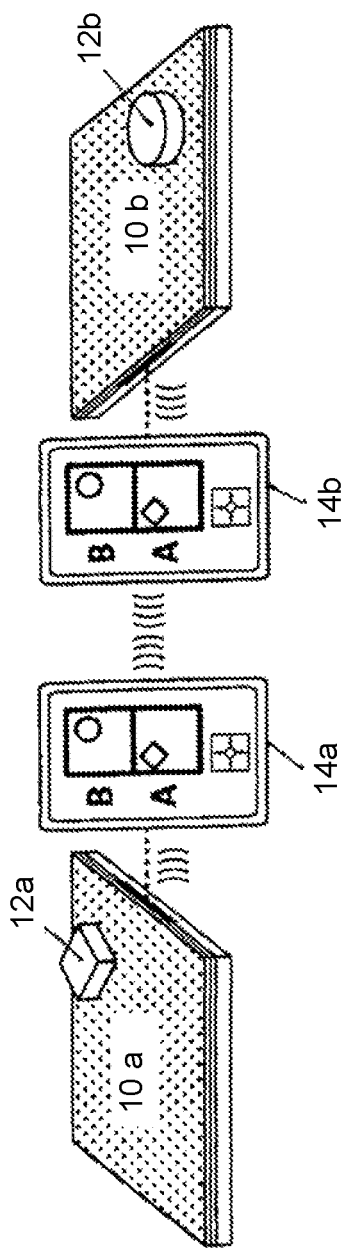
FIGS. 6A and 6B depict schematic illustrations for explaining the combinability and communication of systems according to the present teachings.
Figure 6B:
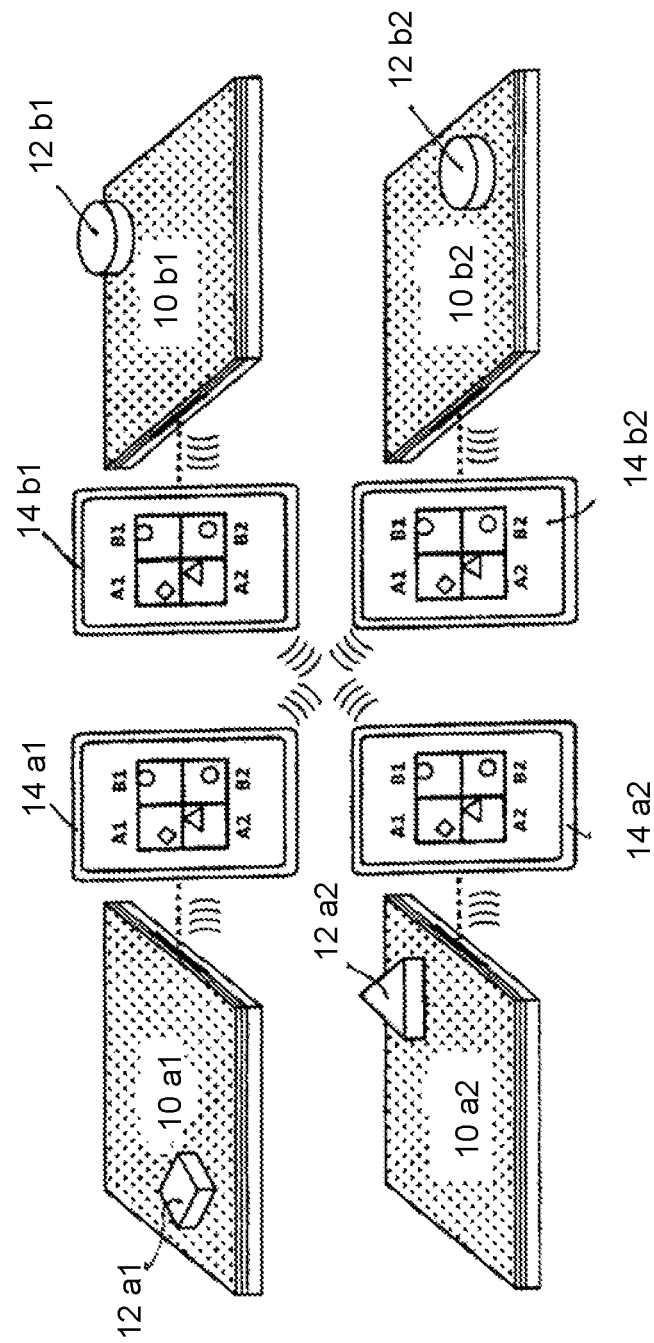

FIGS. 6A and 6B show how systems according to the present teachings can be used at various locations and can communicate with one another:

As shown in FIG. 6A, a first control unit 14a is associated with a first detecting unit 10a. A second control unit 14b is associated with a second detecting unit 10b. The two control units, for example, smartphones, communicate with each other, for example, via the internet, so that the detecting surface and the object 12a of the detecting unit 10a are additionally depicted on the display of the second control unit 14B, and the detecting surface and the object 12b of the detecting unit 10b are additionally depicted on the display of the first control unit 14A. The user of the system 10a, 14a and the user of the system 10b, 14b can thus play interactively, even when they are distant from each other.

One exemplary application is as follows:

FIG. 6B shows an arrangement analogous to FIG. 6A having four mutually communicating systems A1, A2, B1, B2 that are located at locations distant from one another. It is understood that the different systems also could be disposed in a common space.

Figure 7A:
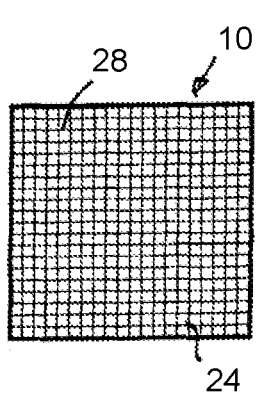
FIGS. 7A, 7B and 7C depict schematic views of three embodiments of a detecting unit having different functional layers.
Figure 7B:
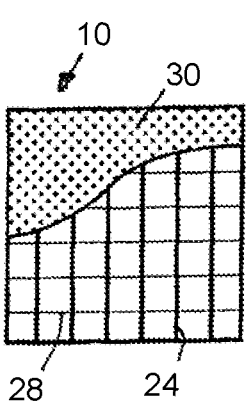
Figure 7C:
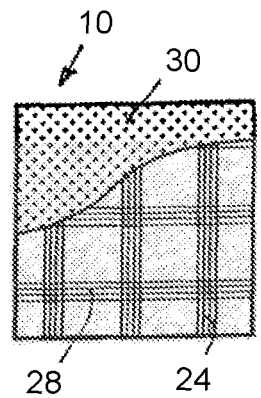

FIGS. 7A-7C show schematic views of three different embodiments of detecting units 10, wherein the decorative layer 30 is not depicted in FIG. 7A and the decorative layer 30 is only partially depicted in FIGS. 7B and 7C.

FIG. 7A shows a structural embodiment in which the thickness of the electrodes or conductors 24, 28 of the functional layers is small, for example, only 4-20 µm. The distance between the conductors is, for example, 5-10 Using this design, it is achieved that the conductors are not visible, or are only barely visible, through transparent regions of the decorative layer 30. In addition, objects located on the detecting surface can be detected with good resolution.

FIG. 7B shows an embodiment in which the conductors 24, 28 are thicker and spaced farther from each other. The number of detecting points per surface area is thereby significantly reduced. The width of the conductors is, for example, 10 µm to 1.5 mm. The distance between the conductors is, for example, 1 mm to 10 mm. Accordingly, large surface areas can be evaluated using a processor, similar to the embodiment according to FIG. 7A, however with lower resolution. It is understood that a plurality of processors that each evaluate a portion of the detecting surface can be networked with one another for the evaluation.

FIG. 7C shows an embodiment in which the electrical conductors 24, 28 of the functional layers are each disposed in groups spaced from one another such that surface areas located in the crossing region of the groups can be evaluated with greater precision, whereas regions lying therebetween cannot be evaluated.

Figure 8:
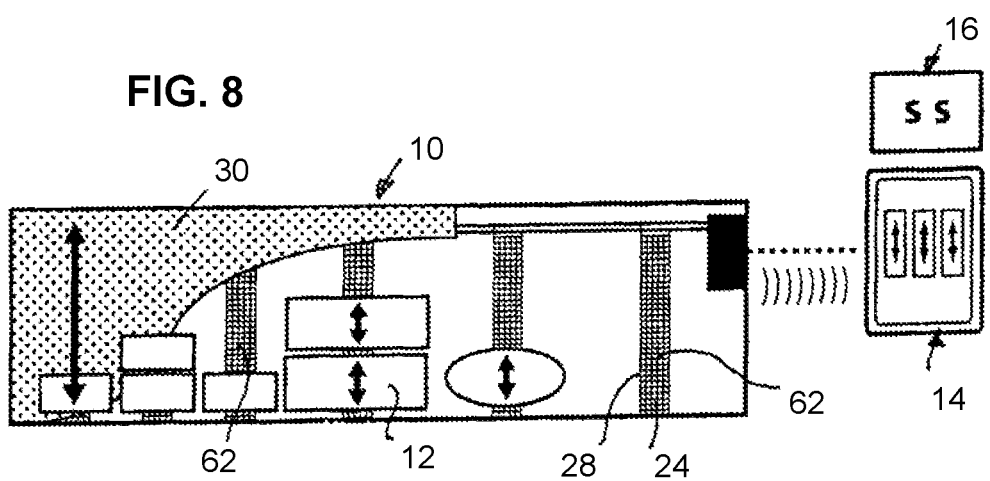
FIG. 8 depicts a schematic plan view of a further embodiment of a detecting unit.

FIG. 8 shows a schematic view of a detecting unit 10, in which the electrical conductors 24, 28 of the functional layers form discrete, adjacently-disposed strips 62. Fields corresponding to the strips 62 are advantageously visualized on the decorative layer 30. In this way, for example, objects 12 on a shelf surface that are disposed above the strips 62 can be recognized so that the occupancy state of the shelf can be determined.

Figure 9:
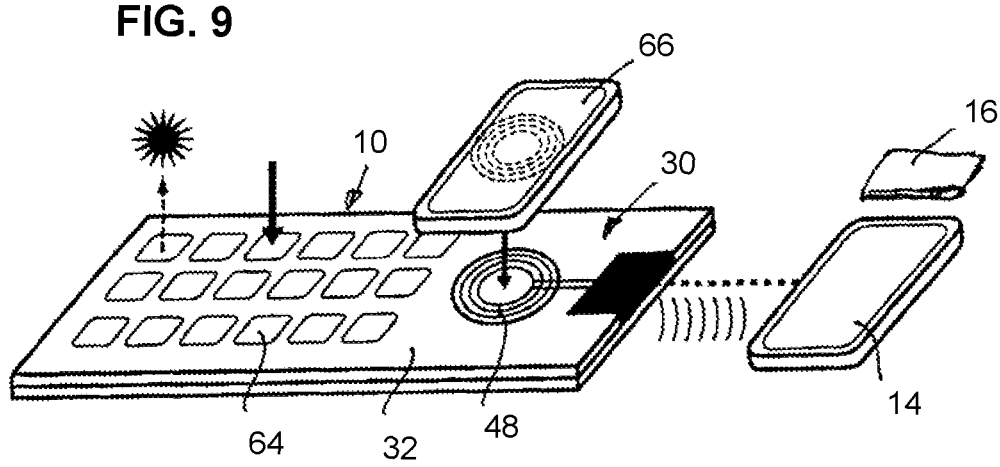
FIG. 9 depicts a perspective view of a modified embodiment of a detecting unit.

FIG. 9 shows a perspective view of a detecting unit 10. The decorative layer 30 or its detecting surface 32 is provided only with marked fields 64. Functions that can be stored in the program unit 16 can be assigned using the control unit 14 by tapping a particular marked field 64, for example, using a finger. Thus, for example, a keyboard or a complex operation field (control panel) for controlling a wide variety of units can be created. Furthermore, the detecting unit 10 is provided with an antenna 48, via which electrical energy can be supplied to the detecting unit 10 from an external unit 66, for example, a smartphone.

In a further development of the embodiment according to FIG. 9, the marked fields can be created, for example, using a drawing stylus, on the detecting unit 32 initially at its startup. The positions (movements) of the drawing stylus on the detecting surface 32 are detected by the control unit 14. As soon as the stylus has circumscribed a surface region and has traversed (completed) a closed line, an operation field (e.g., a marked field 64) is defined with the assistance of a program stored in the control unit 14 or the program unit 16. Commands can be associated with this operation field, for example, by drawing a symbol known to the program in the operation field (marked field 64). The commands are then carried out as soon as a finger moves on (touches) the operation field. In this way the entire graphic of the operation field or the decoration of the decorative layer 30 can be designed in a user-customized manner.

Figure 10:
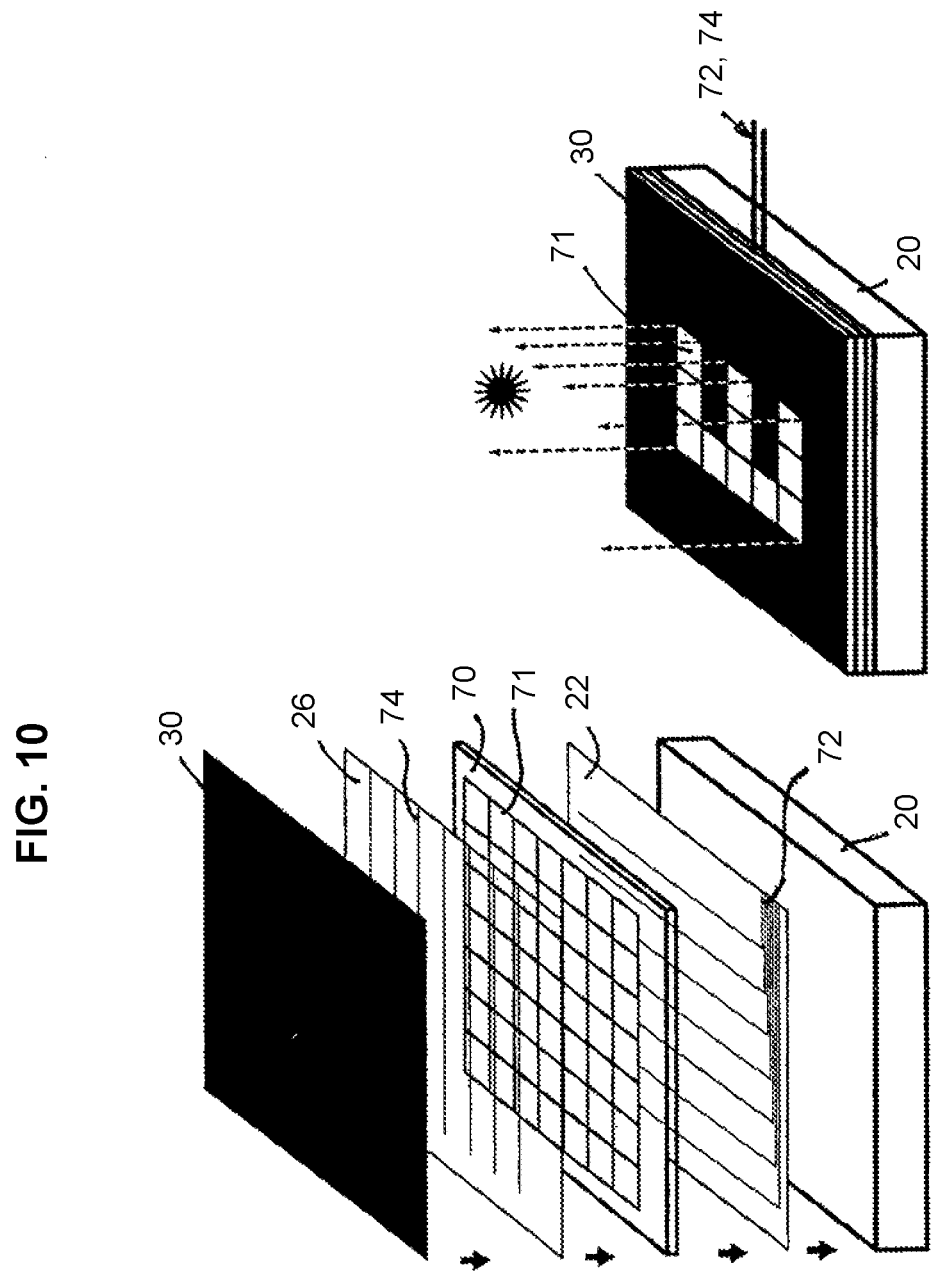
FIG. 10 depicts a schematic illustration for explaining the integration of an OLED layer into a detecting unit according to the present teachings.

FIG. 10 shows an excerpt of an arrangement similar to FIG. 1B, wherein the decorative layer 30, the functional layers 22 and 26, and the carrier layer 20 each form regions (portions) of the respective layers of FIG. 1B. Although depicted black, the depicted region of the decorative layer 30 is transparent or translucent. An OLED layer 70 is disposed between the first functional layer 22 and the second functional layer 26; the OLED layer 70 is divided into discrete segments 71. The functional layers 22 and 26 include schematically-depicted contacting conductors 72 and 74, one ends of which are each connected in an electrically-conductive manner with sides of one of the segments 71 that face away from each other, and other ends of which can be supplied with a voltage in a manner controlled by the evaluating unit 36 (FIG. 1B). The evaluating unit 36 additionally contains a receiver unit that receives signals for controlling the OLED segments 71 from the associated control unit 14 (FIG. 1A). If the decorative layer 30 or detecting surface 32 is formed in an appropriate, at least partially transparent manner, the detecting surface can be selectively illuminated in accordance with the program activated in the control device, as can be seen from the right part of FIG. 10, which shows the arrangement in a perspective depiction. The OLED-forming layer regions can be manufactured in a digital manufacturing process together with the functional regions of the touchpad, or can be integrated therein.

Instead of the two connecting conductors per functional layer 22, 26, which are schematically depicted in FIG. 1B, only one connecting conductor per functional layer 22, 26 also can be provided to connect opposite ends of each conductor 24, 28 to the evaluating unit 36; the connecting conductor is connected to ends of the respective conductors 24, 28 of a functional layer 22, 26, which ends lie on the same side.

Further embodiments of detecting units 10 are depicted in FIGS. 11 to 22. Since their construction is fundamentally similar to that of the first embodiment, only differences are described and, unless otherwise stated, the description above also applies to the further embodiments. Identical or similar components are denoted with the same reference numbers.

Figure 11:
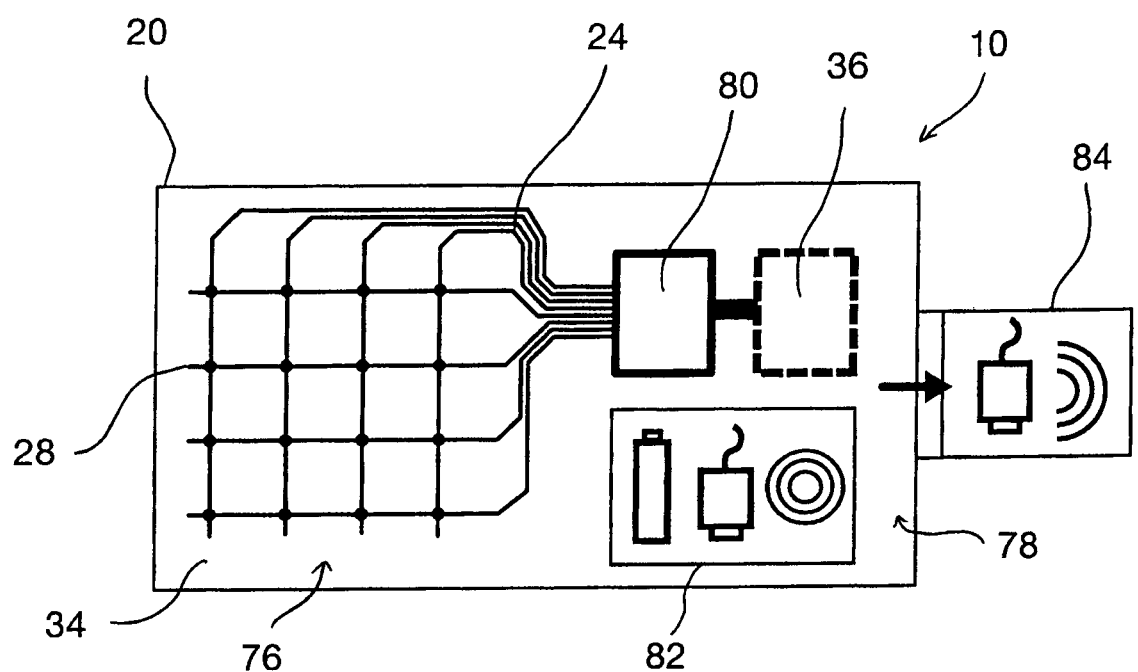
FIG. 11 depicts a schematic plan view of a further embodiment of a detecting unit.

No decorative layer is shown in FIG. 11. The detecting unit 10 according to the further embodiment shown in FIG. 11 includes a carrier layer 20 that is schematically divided into a touchpad region 76 and a module region 78. The touchpad region 76 includes conductors 24 extending in the Y direction and conductors 28 extending in the X direction, which is perpendicular to the Y direction. The module region 78 includes a processor module or controller 80, which is connected to the conductors 24, 28, and an evaluating unit 36, which is connected to the processor module 80. Furthermore, in the module region 78 an energy supply module 82 is provided, which serves as the energy supply of the processor module 80 and of the evaluating unit 36 and is also connected to them (not shown). Furthermore, a communication module 84 is provided for effecting communication between the evaluating unit 36 and/or processor module 80 and external devices, and is also connected to these and to the energy supply module 82.

Preferably the touchpad 76 and at least parts of the module region 78 are manufactured using an electronically-controllable droplet print method (inkjet), as is also described above with respect to the other embodiments. FIGS. 13A to 13D show views of inkjet printing patterns for forming the conducting-path design shown in FIG. 11 using linear electrical conductors 24, 28 on the carrier layer 20 or on a component forming the carrier layer. Each of FIGS. 13A to 13D schematically shows the inkjet pattern for an embodiment in which discrete layers are successively applied. As shown in FIG. 13A, in the touchpad region 76, the conductors 24, which are made of an electrically-conductive material and extend parallel in the Y direction, are thus first sprayed (as the lowest) onto the carrier layer 20. In the second step, which is shown in FIG. 13B, insulating regions or insulating layers 86 made of insulating material are sprayed at least onto the regions (portions) of the conductors 24 that will be covered in the next step by the conductors 28 that extend in the X direction. The insulating-regions or insulating-layers 86 are depicted in an exemplarily manner as two-dimensional, punctiform or solid-circular regions, but can have any shape and/or thickness to adapt to the conductors to be insulated from one another or the power to be insulated. In the third step shown in FIG. 13C, the conductors 28, which are made from electrically-conductive material and extend parallel in the X direction, are sprayed-on, and specifically such that they extend over the insulating regions 86. The conductors 24 are insulated (isolated) from the conductors 28 by the insulating regions 86. A grid of conductors 24, 28, which are insulated from each other, is thus formed on the carrier layer 20 (FIG. 13D). Using modern inkjet printing methods, the steps shown in FIGS. 13A to 13C can also be produced in an operation in which the different materials (conductor-insulator-conductor) are sprayed-on directly one-after-the-other. The functional layers 22, 26 and the insulating layer 29 made of film material, which are described in the first embodiment, are not required in this embodiment. The arrangement of the conductors can be varied as desired. The individual conductors 24, 28 are connected to a not-depicted terminal region or directly to the processor module 80 or the evaluating unit 36 via separate or common connecting conductors (at least one connecting conductors for the conductors extending in the X direction and at least one conducting conductor for the conductors extending in the Y direction). Finally, to protect the conductors, an insulating layer that completely covers the conductors is preferably printed or attached (film) onto the conductors.

Referring again to FIG. 11, the processor module 80, the evaluating unit 36, the energy supplying module 82 and the communication module 84 can preferably also be manufactured completely or partially using inkjet (electronically-controllable droplet) printing methods. The connection to one another and to the conductors 24, 28 is also effected via printed or otherwise manufactured conductive connections. In the alternative, individual or all modules and/or the evaluating unit 36 can also be externally provided and connected to the conductors 24, 28 only via a terminal region. In a terminal region, the conductors or the connecting lines are exposed at the surface such that an electrically-conductive connection is produced by pressing conductive collectors (not shown). In the depicted embodiment, the processor module 80 is connected in an electrically-conductive manner to the conductors or connecting conductors, for example, via adhesive or via a pressed elastic connection or by direct contact.

The processor module 80 has the function of detecting in a known manner the position of an input (contact) on the not-depicted decorative layer or on detecting surface in the touchpad region 76. The evaluating unit 36 can filter the information according to predetermined specifications and route the information to a computing process via the communication module 84. In the alternative, the evaluating unit 36 can be a part of a computer or smartphone that communicates with the processor module 80 via the communication module 84.

To supply energy to the processor 80 and/or the evaluating unit 36, the communication module 84 includes a battery, an accumulator, a terminal region, and/or an antenna. Instead of an autonomous energy supply using a battery or accumulator or to charge an accumulator, a wired energy supply via the terminal region (not shown), for example, can be provided. Alternatively or additionally, energy can be supplied wirelessly by using induction via the antenna.

Communication with computers, such as PCs, smartphones/tablets, or networks, is effected via the communication module 84, which, for example, also includes a terminal region for wired communication and/or an antenna for wireless communication. The processor module 80, the evaluating unit 36, the energy supplying module 82 and/or the communication module 84 are, for example, connected to one another via cable connections or via conductors (not depicted) also printed on the carrier layer 20.

A touchpad 34 is thus disclosed that can be formed in large part or even completely by inkjet (electronically-controllable droplet) printing directly on the carrier layer 20 or on a corresponding component, without corresponding functional layers having to be present. As will be described below, by using a decorative layer applied on the conducting paths 24, 28 at least in the touchpad region 76, a height compensation between the conducting paths 24, 28 and the carrier layer 20 can also be achieved such that the conducting paths 24, 28 and optionally also the modules are neither haptically nor optically detectable from above.

Using the communication module 84, for example, the keyboard layout of the touchpad 34 can be set using a programmable device (mobile telephone) or the touchpad 34 can be used as input device for an external device (mobile telephone).

FIGS. 12A to 12D show views of inkjet (electronically-controllable droplet) printing patterns for forming an alternative conducting-path design having planar conducting regions. In this embodiment, the straight-line conductors 24, 28 of the exemplary embodiment shown in FIGS. 13A to 13D are instead formed as planar (2-D) conducting regions 88 connected to one another in the Y direction and planar (2-D) conducting regions 90 connected to one another in the X direction. In a first step, as is shown in FIG. 12A, several rows of planar conducting regions 88 are formed (printed) extending parallel in the Y direction, wherein each planar conducing region 88 is formed as a square, in which two opposite corner points lie on a line extending in the Y direction. The discrete, square-shaped planar conducting regions 88 are connected to one another at these corner regions to form a row extending in the Y direction. In the present embodiment, the respective corners are connected to one another via linear (1-D) connecting regions 91. Thus, several parallel rows of square-shaped planar conducting regions 88, which are disposed one-after-the-other in the Y direction and are connected to one another, result.

In the second step shown in FIG. 12B, similar to the embodiment shown in FIGS. 13A to 13D, insulating regions 86 are applied at the points at which the conductors 24 extending in the Y direction are later covered by the conductors 28 extending in the X direction. In the design having planar conductor regions, as is shown in FIGS. 12A to 12D, the insulating regions 86 are preferably applied onto the linear connecting regions 91 between the discrete planar conducting regions 88.

As shown in FIG. 12C, conductors 28 having planar conducting regions 90, which extend in the X direction and correspond to the planar conducting regions 88 of the conductors 24 extending in the Y direction, are applied in a third step, wherein the also square-shaped planar conducting regions 90 are now connected to one another in the X direction via linear connecting regions 91. In this manner, the connecting regions 91 of the planar conducting regions lie on the insulating regions 86 such that the conductors 24, 28 are insulated from each other.

The finished touchpad 34 depicted in FIG. 12D thus includes, as also in the previous embodiments, conductors 24 and 28 that extend perpendicular to each other and are insulated with respect to each other via the insulating regions 86. As can be seen by a comparison of FIGS. 13D and 12D, a significantly larger surface coverage is achieved by the conductive regions 88, 90 in the embodiment shown in FIG. 12D. For this reason, the sensitivity and detection precision of a touchpad 34 having a conducting path design having planar conducting regions 88, 90 according to FIG. 12D can be increased compared to that in FIG. 13D. The shape of the planar conducting regions can be varied as desired.

FIGS. 14A and 14B show two cross-sectional views of the conducting-path design having square-shaped planar conducting regions 88, 90, which are shown in FIG. 14C. FIG. 14A depicts a sectional area extending in the Z and X directions perpendicular to the Y direction in the region of one of the conductors 28, and FIG. 14B depicts a sectional area extending in the Z and Y directions perpendicular to the X direction in the region of one of the conductors 24. Since the conductors 24 and the insulating regions 86 are applied onto the carrier layer 20 before the conductor 28 in this embodiment, the conductor 24 is always the lower conductor in regions in which two conductors intersect (are disposed one-atop-the-other). To insulate the two conductors 24, 28 from each other, in regions in which two conductors 24, 28 are disposed one-atop-the-other, the planar insulating regions or insulating layers 86 are provided here in a punctiform or solid-circular manner by way of example. Due to the layers disposed one-atop-the-other, the elevations shown in FIGS. 14A and 14B can be equalized or smoothed by subsequently applied equalizing layers, such as, for example, the decorative layer.

FIGS. 15 to 19 show further construction variants for a layer structure of the touchpad 34 or of the detecting unit 10. In FIGS. 15 to 19, decorative layers are denoted with reference number 30. As is shown in FIG. 15, a decorative layer 30 preferably includes a primer layer 92, a cover layer 94, a decorative printing 96, and a preferably clear cover layer 98, wherein the primer layer 92, the cover layer 94, and the cover layer 98 are merely preferably present. The primer layer 92 serves for better adhesion of the subsequent cover layer 94 or of the decorative printing 96 on the carrier layer 20 or the conducting paths 22, 24 applied onto the carrier layer or possible insulation layers and/or modules or functional layers 22, 26. For better depiction of colors and for better covering of the conductors 24, 28, the preferably white or light-colored cover layer 94 is preferably applied before applying the decorative printing 96. The decorative printing 96 is subsequently applied on the cover layer. As was described above in detail with respect to the first embodiment, in addition to a colored decoration, the decorative printing 96 can also or alternatively form a haptically detectable decoration, i.e., a relief surface. A cover layer 98 is preferably applied on the decorative printing 96. The decorative printing 96 can be protected by the cover layer 98. Furthermore, if a flat surface is desired, any unevennesses that also arise, for example, due to the conductors 24, 28, can be equalized or smoothed by the cover layer 98. All layers mentioned above can be formed by inkjet (electronically-controllable droplet) methods in one or more operations (steps).

An embodiment is shown in FIG. 16 in which the combination, described above with regard to the first embodiment, of the first functional layer 22 and second functional layer 26 with the insulating layer 29 disposed therebetween is applied onto a lower first carrier layer 20. According to a first alternative of FIG. 16 (left side), a second carrier layer 20 is fixedly or exchangeably applied on the uppermost functional layer 26, onto which a decorative layer 30 is preferably already previously applied. According to the second alternative (right side) of FIG. 16, the decorative layer 30 can be directly fixedly or exchangeably provided on the second functional layer 26 as is also shown in the first embodiment. In the second alternative of FIG. 16, when it is to be exchangeable, the decorative layer 30 should be self-supporting. The first alternative of FIG. 16 has the advantage that the decorative layer can be applied on a defined smooth surface of the second carrier layer 20 and a plurality of exchangeable second carrier layers 20 including decorative layer 30 applied thereto can be provided that can be applied or placed as needed onto the first carrier layer 20 having the first functional layer 22, insulating layer 29, and second functional layer 26 applied thereon. On the one hand, this has the advantage that a universal carrier layer having a touchpad can be manufactured independently of modularly-formed decorative layers 30; or one and the same carrier layer 20 having a touchpad can be used for various decorations.

FIG. 17 shows a further embodiment in which the touchpad 34 made of the decorative layer 30, first functional layer 22, insulating layer 29, and second functional layer 26 is provided in the specified sequence on the underside of a completely or partially transparent material 100 (for example, acrylic, glass, etc.). Using the completely transparent or partially transparent material 100, an essentially non-wearing detecting surface 32 of high quality can be provided for the touchpad 34 and the functional layers 22, 26 for detecting an input are provided on the back side thereof; the decoration of the decorating layer 30 is visible through the detecting surface 32.

FIG. 18 shows, in a first alternative (left side), a second functional layer 26, insulating layer 29, and first functional layer 22 provided on the underside of a first carrier layer 20, and a second carrier layer 20, on which a decorative layer 30 is provided, fixedly or exchangeably provided on the topside of the first carrier layer 20. In the alternative (right side) of FIG. 18, the decorative layer 30 can also be directly fixedly or exchangeably provided on the first carrier layer 20.

In the embodiment shown in FIG. 19, a second functional layer 26 is provided on the underside of a first carrier layer 20, a second carrier layer 20 is provided on the underside of the second functional layer 26, and a first functional layer 22 is provided on the underside of the second carrier layer 20. A third carrier layer 20 having a decorative layer 30 applied thereon is fixedly or exchangeably provided on the top side of the first carrier layer 20 on this system made of functional layers 22, 26 and carrier layers 20. In the alternative (right side) of FIG. 19, the decorative layer 30 is directly fixedly or exchangeably provided on the topside of the first carrier layer 20.

As is symbolically depicted in FIG. 20, the combinations depicted in FIGS. 1 to 19 of functional layers and carrier layers having decorative layers or carrier layers having conducting paths directly sprayed thereon can take any desired shape. The carrier layers can be formed by any desired components.

FIG. 21 shows a further embodiment of a detecting unit 10. In the view depicted in FIG. 21 of such a detecting unit 10, only the decorative layer (decoration) 30 or detecting surface 32 is visible, under which electrical conductors 24, 28 corresponding to the above embodiments are disposed in the entire area for detecting an input. The further modules (processor, etc.) are also not depicted and could be provided under the conductors or adjacent to them or externally. The decorative layer 30 or the decoration 30 includes a numeric keypad region 102, in which a typical numeric keypad for inputting numbers and/or letters is depicted, a slide control region 104, using which a selection between two end points, for example, the setting of a volume between maximum and minimum, is possible, function-key regions 106 for predetermined functions, in which corresponding function symbols are already depicted, and freely-configurable function-key regions 108, which are partially provided with exemplary symbols, as buttons and/or switches. Individual or all buttons can be illuminated by a suitable illumination means.

As can be seen from FIG. 21, any desired touchpad manufactured using the above-mentioned methods, preferably using inkjet, can be formed on/below any desired surface (carrier layer) and provided with any desired decoration. The input regions determined by the decoration (buttons/switches) can be fixedly or variably programmed software-side and/or hardware side (or vice versa) so that, upon detecting an input in the region of a switch or of a button, a function associated with the switch or the button is carried out. Thus, by using touchpads that are always manufactured in the same way, any desired number of different control panels, button fields, etc. can be manufactured, which can be adapted to the requirements of the customers as desired. Owing to the manufacture according to the inkjet (electronically-controllable droplet) method, a just-in-sequence manufacturing is possible in the production process in straightforward manner without pre-production.

The regions and/or sensitivities, in or by which an input is detected, can also be freely determined (is the switch or the button shown in the decoration to be hit precisely or are regions around the switch or the button also suitable for input). The freely-assignable function key regions 108 can, for example, be associated with desired favorite functions (seat position, telephone call, music title, etc.) by a user.

As can be seen by way of example from FIG. 21, by using a detecting unit as has been described in detail in the previous embodiments, a wide variety of functions can thus be configured by varying the decorative layer and the corresponding programming of the detecting regions in the touchpad. In this way, the functional region of the detecting unit for forming a touchpad can essentially always be manufactured in an identical manner.

Such operation fields (control panels) are used, for example, in interior surfaces of vehicles, airplanes, or in operation fields (control panels) of machines or systems. A specific decoration can be associated with the surface wherein the touch function serves as a component of the decorative surface.

FIGS. 22A and 22B show a further application for a detecting unit according to the present disclosure. For example, input regions of different types can be provided on the decorative layer 30 of a detecting unit 10. In FIG. 22B, a numeric keypad region 102 marked with V is depicted on the right side, a handwriting entry region 114 marked with K2 is depicted in the middle, and a code card region 112 marked with K1 is depicted on the left side. For authentication of a user, it can be provided, for example, that first a code card 112 (that can be any desired object), as is shown in FIGS. 22A and 22B, must be placed on the code card region 110 of the detecting unit 10. Such a code card 112 can include, for example, various surface area portions 116 made of differently thick and/or differently shaped and/or differently patterned metal layers and/or metal layers having various capacitances, which can be detected in the detecting unit 10, as was also described, for example, with regard to the first embodiment. Additionally or alternatively, discrete metallic surface area portions of the code card 112 or of any desired object can be doped at different strengths with charges having different polarities, whereby a coding can also be effected. The code card 112 can thus be coded with nearly infinitely many codes using one or more different arrangement patterns, thicknesses, shapes, doping (strength of the charge), polarization directions, etc. In the alternative, a relatively large amount of data (object data) can be stored in such a code card 112 in the arrangement pattern(s), thicknesses, shapes, doping, etc. In the handwriting input area 114, for example, a predetermined figure or signature can be subsequently input by a user. A code can be input in the numeric keypad region 102. As can also be seen from this embodiment, inputs of a wide variety of types can be detected using one and the same touchpad without separate detecting units having to be provided therefor, as is known in the prior art.

Figure 23:
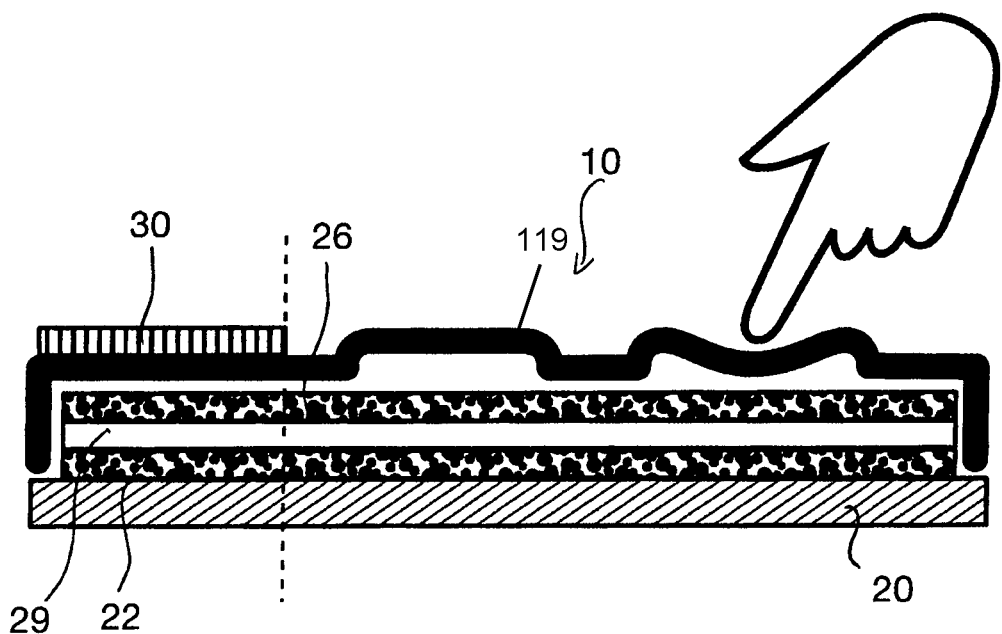
FIG. 23 depicts a cross-sectional view of the layer structure according to a further embodiment.

In FIG. 23 a further embodiment of a detecting unit 10 is shown, in which an elastic layer 119 is provided at least in certain area(s) over the system (comprising the first functional layer 22, insulating layer 29, and second functional layer 26) that is applied onto a carrier layer 20. The sectional elastic layer 119 can preferably also be formed on the upper functional layer 26 according to an inkjet (electronically-controllable droplet) method. In the alternative, the layer can be formed in a conventional manner and attached to the above-mentioned system in a suitable manner. The sectional elastic layer 118 preferably includes an appropriate decoration on its topside and/or underside (for example, when the elastic layer is transparent); for example, switch regions or button regions according to FIG. 21 can be depicted by the decoration. Preferably the switch- or button-regions are also configured in a three-dimensionally and haptically detectable manner, for example, by appropriately forming the switches and/or buttons. The response behavior of the switches/buttons can be determined by the material thickness, elasticity properties, and/or the corresponding shape of the respective button-/switch-region in the sectional elastic layer, and a corresponding programming.

In the embodiments shown in FIGS. 16 to 19 and 23, the first and second functional layer 22, 26 and the insulating layer 29 can be replaced by the design, described with respect to FIGS. 11 to 13, of the touchpad (conductors 24, 28 and insulating regions 86 directly applied using an inkjet (electronically-controllable droplet) printing method).

The exemplary systems described above can be modified and supplemented in the context of the original disclosure, wherein the described features can be combined with one another in different ways. For example, the touchpad 34 can be configured in a pressure-elastic manner so that it also detects the weight of objects located thereon.

The touchpads described above can also be provided for touchpads having a homogeneous contact layer, i.e., the contact layer can be optically or haptically identical over its entire extension (surface). Such a homogeneous contact layer can be manufactured by conventional methods or by inkjet. A homogeneous contact layer can be combined with conductors (printed on a plurality of films, or on both sides of a film, or directly one-atop-the-other) manufactured by an inkjet (electronically-controllable droplet) printing method.

In the alternative to applying conductors on separate functional layers (films) described with regard to the first embodiment, the first conductor can be applied on a first side of a film and the second conductor can be applied on the second side of the film (for example by inkjet (electronically-controllable droplet) printing). Such a film can then be applied to a carrier layer.

Further aspects of the present disclosure are:

1. According to a first aspect, a system for detecting the position and/or the type of at least one object on a detecting surface, as well as for generating and outputting object-specific information, including
a detecting unit (10) having a touchpad (34), a detecting surface (32) detected by the touchpad, an evaluating unit (36) for generating object data associated with an object (12) located on the detecting surface (32),
a transmitter unit (38) for transmitting the object data, a control unit (14) having a receiver unit (14a) for receiving the object data, a computer (14b) for evaluating the object data and generating evaluation data, as a function of the object data, in accordance with a predetermined program, and an output unit (14c) for outputting information derived from the evaluation data.

2. System according to aspect 1, wherein the detecting surface (32) is the surface of a decorative layer (30) disposed on the touchpad (34).

3. System according to aspect 2, wherein the detecting surface (32) includes visually and/or haptically detectable positions and/or paths.

4. System according to one of aspects 1-3, wherein different decorative layers (30) are disposable on the touchpad (34).

5. System according to one of aspects 1-4, including a program unit (16), in which programs that function in accordance with objects (12) and/or the decorative layer (30) are stored.

6. System according on one of aspects 1-5, wherein the information derived from the evaluation data and output by the output unit (14c) is visually and/or acoustically detectable.

7. System according to aspect 6, including a display (42), on which the information derived from the evaluation data and output by the output unit (14c) is displayed as the type of the object (12) and/or its position on the detecting surface (32).

8. System according to one of aspects 1-7, wherein the information derived from the evaluation data and output by the output unit (14c) includes a command for moving an object (12) located on the detecting surface.

9. System according to aspect 8, including a program unit (16), using which the various programs can be input into the control unit (14), the visual and/or acoustic commands being output in accordance therewith.

10. System according to one of aspects 1-9, wherein the at least one object (12) includes a remotely controllable drive device, and the control unit (14) includes a control device (44) for controlling the drive device.

11. System according to one of aspects 1-10, including at least two detecting units (10), each having at least one edge, along which sensors (60) are disposed, wherein the evaluating unit (46) of at least one detecting unit, when detecting units are located with their edges in mutual abutment, detects the positions of the detecting units relative to each other and transmits relative position data at least to the control unit (14) associated with the at least one detecting unit, whereupon the detecting surfaces of both detecting units are displayed on the display (42) of the control unit.

12. System according to one of aspects 1-11, wherein the detecting unit (10) includes a sensor unit (48, 50, 52) separate from the touchpad (34), the output signal of the sensor unit (48, 50, 52) being transmissible by the transmitter unit (38).

13. System according to one of aspects 1-12, wherein conducting paths of the touchpad (34) are applied onto a base layer (22, 26) in an inkjet printing method.

14. System according to one of aspects 1-13, wherein the detecting surface (32) is three-dimensionally shaped.

15. System according to one of aspects 1-14, wherein the detecting unit (10) includes an OLED layer (70) disposed below a transparent region of the detecting surface (32).

16. System according to aspect 15, wherein conducting paths for controlling the OLED layer (70) are manufactured together with conducting paths of the touchpad in an inkjet printing method.

17. According to a seventeenth aspect, a touchpad having two functional layers (22, 26) disposed one-over-the-other, each of which includes a plurality of electrical conductors (24, 28) that are disposed, in a plan view of the conductors (24, 28), in a crossing manner, and a contact layer disposed over the functional layers (22, 26); upon the contact layer being contacted, a signal can be picked up from the conductors (24, 28), using which signal the location of the contacting of the contact layer is determinable, wherein the contact layer is configured as a decorative layer (30), whose topside is provided with a visually and/or haptically detectable decoration.

18. According to an eighteenth aspect, a system for detecting the position and/or the type of at least one object on the detecting surface, as well as for generating and outputting object-specific information, including a detecting unit (10) having a touchpad (34), a detecting surface (32) detected by the touchpad, an evaluating unit (36) for generating object data associated with an object (12) located on the detecting surface (32), a transmitter unit (38) for transmitting the object data, a control unit (14) having a receiver unit (14a) for receiving the object data, a computer (14b) for evaluating the object data and generating evaluation data, as a function of the object data, in accordance with a predetermined program, and an output unit (14c) for outputting information derived from the evaluation data, wherein a thickness and/or a shape and/or size of at least one electrically-conductive layer of the at least one object, and/or the weight and/or the position on the touchpad of the at least one object is contained in the object data.

19. According to a nineteenth aspect, a system for detecting the position and/or the type of at least one object on a detecting surface as well as for generating and outputting object-specific information, including at least one detecting surface (10) having a touchpad (34), a detecting surface (32) detected by the touchpad (34), which detecting surface (32) is a surface of a decorative layer disposed on the touchpad (34), an evaluating unit (36) for generating object data associated with an object (12) located on the detecting surface (92), a transmitter unit (38) for transmitting the object data, a control unit (14) including a receiver unit (14a) for receiving the object data, a computer (14b) for evaluating the object data and generating the evaluation data, as a function of the object data, in accordance with a predetermined program, and an output unit (14c) for outputting information derived from the evaluation data, wherein at least two detecting units (10), each having at least one edge, are provided, along which sensors (60) are disposed, and wherein the evaluating unit (46) of at least one detecting unit, when the detecting units are located with their edges in mutual abutment, detects the positions of the detecting units relative to each other and transmits relative position data at least to the control unit (14) associated with the at least one detecting unit, whereupon the detecting surfaces of both detecting units are displayed on the display (42) of the control unit.

20. According to a twentieth aspect, a touchpad having a plurality of first electrical conductors (24) and a plurality of second electrical conductors (28) that are disposed, in a plan view of the conductors (24, 28), in a crossing manner with the first conductors (24), and a contact layer disposed over the conductors (24, 28); upon the contact layer being contacted, a signal can be picked up from the conductors (24, 28), using which signal the location of the contacting of the contact layer is determinable, wherein the electrical conductors (24, 28) are formed using an inkjet printing method.

21. Touchpad according to aspect 20, wherein the first and the second conductors (24, 28) are sprayed on the same side of a base material, wherein an insulating region (86) is provided at least in regions, in which the conductors cross, for insulating the first conductor (24) with respect to the second conductor (28) and it is formed between the conductors by inkjet.

22. Touchpad according to aspect 20 or 21, wherein each of the conductors (24, 28) has planar conducting regions (88, 90) connected to one another.

23. Touchpad according to aspect 22, wherein the planar conducting regions (88, 90) are connected via linear connecting regions, and the conductors are disposed in a plan view thereon such that the linear connecting regions of the first conductor cross with the linear connecting regions of the second conductor and are disposed extending one-over-the-other.

24. Touchpad according to aspect 22 or 23, wherein in a plan view the planar conducting regions (88) of the first conductor do not overlap with the planar contacting regions (90) of the second conductor.

REFERENCE NUMBER LIST

10 Detecting unit
12 Object
14 Control unit
14a Receiver unit
14b Computer
14c Output unit
16 Program unit
20 Carrier layer 22 First functional layer
24 Electrical conductor
26 Second functional layer
28 Electrical conductor
29 Insulating layer
30 Decorative layer
32 Detecting surface
34 Touchpad
36 Evaluating unit
38 Transmitter unit
40 Recess
42 Display
44 Operation field
46 Functional layer
48 Antenna
50 Sensor field
52 Switch fields
60 Distance sensor
62 Strips
64 Field
66 External unit
70 OLED layer
71 Segments
72 Contacting conductors
74 Contacting conductors
76 Touchpad region
78 Module region
80 Processor module (controller)
82 Energy supplying module
84 Communication module (similar to transmitter unit 38)
86 Insulating region
88 Planar conducting region
90 Planar conducting region
91 Linear connecting region
92 Primer layer
94 Cover layer
96 Decorative printing
98 Cover layer
100 Partially or completely transparent material
102 Numeric keypad region
104 Slide control region
106 Function region for predefined function
108 Assignable function region
110 Code card region
112 Code card
114 Handwriting input region
119 Sectional elastic layer

The invention claimed is:

1. A system for detecting the position and/or the type of at least one object contacting a detecting surface, as well as for generating and outputting object-specific information, including:
a detecting unit having a touchpad, comprising:
a plurality of first electrical conductors,
a plurality of second electrical conductors disposed, in a plan view of the second electrical conductors, in a crossing manner with the first electrical conductors,
a decorative layer disposed over the first and second electrical conductors, the decorative layer defining a visually and/or haptically detectable decoration or having a visual and/or haptically detectable decoration applied thereto, and
the detecting surface located on a topside of the decorative layer or above the decorative layer, the touchpad being configured such that, when the detecting surface is contacted by the at least one object, a signal can be detected at one or more crossing first and second conductors proximal to the at least one object,
an evaluating unit configured to receive the signal from the conductors and generate object data associated with the at least one object contacting the detecting surface,
a transmitter unit configured to transmit the object data,
a control unit comprising:
a receiver unit configured to receive the object data,
a computer configured to generate evaluation data, as a function of the object data, in accordance with a program stored in the control unit, and
an output unit configured to output information derived from the evaluation data,
wherein (i) the plurality of first electrical conductors and the plurality of second electrical conductors and/or (ii) the decorative layer is (are) formed by an electronically-controllable droplet printing method; and
wherein the object data contains:
a detected characteristic of at least one electrically-conductive layer or of a plurality of electrically-conductive surface area portions disposed on the at least one object, the detected characteristic being one or more of thickness, shape, size and charge doping,
a detected position on the touchpad of the at least one object, and/or
a detected pattern formed by the plurality of electrically-conductive surface area portions, and
wherein:
the object data includes the detected position on the touchpad of the at least one object,
the decorative layer comprises an indicia,
when the detected position is directly beneath the indicia, the evaluation data is based at least in part on the indicia, and
the indicia is spaced from an edge of the detecting surface by an indicia-free space.

2. A system for detecting the position and/or the type of at least one object contacting a detecting surface, as well as for generating and outputting object-specific information, including:
a detecting unit having a touchpad, comprising:
a plurality of first electrical conductors,
a plurality of second electrical conductors disposed, in a plan view of the second electrical conductors, in a crossing manner with the first electrical conductors,
a decorative layer disposed over the first and second electrical conductors, the decorative layer defining a visually and/or haptically detectable decoration or having a visual and/or haptically detectable decoration applied thereto, and
the detecting surface located on a topside of the decorative layer or above the decorative layer, the touchpad being configured such that, when the detecting surface is contacted by the at least one object, a signal can be detected at one or more crossing first and second conductors proximal to the at least one object,
an evaluating unit configured to receive the signal from the conductors and generate object data associated with the at least one object contacting the detecting surface,
a transmitter unit configured to transmit the object data,
a control unit comprising:
a receiver unit configured to receive the object data,
a computer configured to generate evaluation data, as a function of the object data, in accordance with a program stored in the control unit, and
an output unit configured to output information derived from the evaluation data, wherein (i) the plurality of first electrical conductors and the plurality of second electrical conductors and/or (ii) the decorative layer is (are) formed by an electronically-controllable droplet printing method; and wherein the object data contains:

a detected characteristic of at least one electrically-conductive layer or of a plurality of electrically-conductive surface area portions disposed on the at least one object, the detected characteristic being one or more of thickness, shape, size and charge doping, a detected position on the touchpad of the at least one object, and/or a detected pattern formed by the plurality of electrically-conductive surface area portions, and wherein switch regions or button regions are determined by the decoration, and the signal is detected upon a detection of at least one object contacting the detecting surface in the region of the switch regions or the button regions, and the evaluating unit is configured to receive the signal from the conductors and to generate the object data associated with the at least one object contacting the detecting surface in the region of the switch regions or the button regions.

* * * * *